US010469510B2

(12) United States Patent
Quinlan (10) Patent No.: US 10,469,510 B2
(45) Date of Patent: Nov. 5, 2019

(54) INTERMEDIATE RESPONSES FOR NON-HTML DOWNLOADS

(71) Applicant: Juniper Networks, Inc., Sunnyvale, CA (US)

(72) Inventor: Daniel J. Quinlan, San Francisco, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 163 days.

(21) Appl. No.: 14/169,963

(22) Filed: Jan. 31, 2014

(65) Prior Publication Data

US 2015/0222650 A1    Aug. 6, 2015

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *H04L 29/06* | (2006.01) | |
| *G06F 21/56* | (2013.01) | |
| *G06F 21/85* | (2013.01) | |

(52) U.S. Cl.
CPC ........ *H04L 63/1425* (2013.01); *G06F 21/567* (2013.01); *G06F 21/85* (2013.01); *H04L 63/20* (2013.01); *G06F 2221/2115* (2013.01); *H04L 63/168* (2013.01)

(58) Field of Classification Search
CPC ........ G06F 21/51; G06F 21/56; G06F 21/567; G06F 21/85; G06F 2221/2115; H04L 63/1425; H04L 63/20; H04L 63/168
See application file for complete search history.

(56) References Cited

U.S. PATENT DOCUMENTS

| | | | |
|---|---|---|---|
| 6,088,803 | A | 7/2000 | Tso et al. |
| 7,895,340 | B2 * | 2/2011 | Bates ............ G06F 21/56 709/228 |
| 8,312,539 | B1 | 11/2012 | Nachenberg et al. |

(Continued)

FOREIGN PATENT DOCUMENTS

| | | |
|---|---|---|
| CN | 103186739 | 7/2013 |
| WO | WO 2012/094040 A1 | 7/2012 |

OTHER PUBLICATIONS

Extended European Search report corresponding to EP 15 15 3305, dated Jun. 26, 2015, 7 pages.

*Primary Examiner* — John B King
*Assistant Examiner* — Darshan I Dhruv
(74) *Attorney, Agent, or Firm* — Harrity & Harrity, LLP (57) ABSTRACT

A security device may receive an object destined for a user device. The object may be of an object type that does not describe a web page. The security device may determine that the user device is to be warned regarding the object. The security device may determine a warning object based on determining that the user device is to be warned. The warning object may include information associated with a reason for determining that the user device is to be warned regarding the object, and may include information that allows the user device to receive the object. The security device may provide the warning object. The security device may receive, after providing the warning object, an indication associated with the user device obtaining the object. The security device may allow the user device to obtain the object based on receiving the indication.

20 Claims, 8 Drawing Sheets

(56) References Cited

U.S. PATENT DOCUMENTS

| | | | |
|---|---|---|---|
| 8,533,824 B2* | 9/2013 | Hutton | G06F 21/562 709/206 |
| 8,695,096 B1* | 4/2014 | Zhang | G06F 21/564 707/692 |
| 8,776,227 B1* | 7/2014 | Glick | G06F 21/566 726/23 |
| 8,819,049 B1* | 8/2014 | Yeo | H04L 63/1483 707/765 |
| 9,246,933 B1* | 1/2016 | Krishnappa | H04L 63/1433 |
| 9,256,748 B1* | 2/2016 | Gates | G06F 21/32 |
| 2003/0196098 A1* | 10/2003 | Dickinson, III | H04L 51/12 713/188 |
| 2003/0200460 A1* | 10/2003 | Morota | G06F 21/554 726/24 |
| 2004/0073617 A1* | 4/2004 | Milliken | G06F 21/562 709/206 |
| 2005/0198692 A1* | 9/2005 | Zurko | G06F 21/563 726/24 |
| 2006/0123464 A1* | 6/2006 | Goodman | H04L 63/1416 726/2 |
| 2006/0242712 A1* | 10/2006 | Linn | G06F 21/51 726/26 |
| 2007/0006300 A1* | 1/2007 | Zamir | G06F 21/563 726/22 |
| 2007/0240217 A1* | 10/2007 | Tuvell | G06F 21/56 726/24 |
| 2008/0056487 A1* | 3/2008 | Akyol | H04L 63/0428 380/2 |
| 2008/0196104 A1* | 8/2008 | Tuvell | H04L 51/12 726/24 |
| 2009/0006532 A1* | 1/2009 | Sinn | H04L 51/12 709/203 |
| 2009/0019545 A1* | 1/2009 | Ben-Itzhak | G06F 21/54 726/23 |
| 2009/0113003 A1* | 4/2009 | Lu | G06K 9/00456 709/206 |
| 2009/0172815 A1* | 7/2009 | Gu | G06F 21/552 726/23 |
| 2009/0282483 A1* | 11/2009 | Bennett | H04L 63/1416 726/23 |
| 2009/0282485 A1* | 11/2009 | Bennett | G06F 21/51 726/24 |
| 2009/0287653 A1* | 11/2009 | Bennett | G06F 16/951 |
| 2011/0023118 A1* | 1/2011 | Wright | G06F 11/28 726/23 |
| 2011/0083182 A1* | 4/2011 | Emdee | G06F 21/51 726/23 |
| 2011/0107386 A1* | 5/2011 | de los Reyes | H04N 21/4425 725/118 |
| 2011/0219448 A1* | 9/2011 | Sreedharan | G06F 21/00 726/23 |
| 2011/0239288 A1 | 9/2011 | Cross et al. | |
| 2011/0247072 A1* | 10/2011 | Staniford | H04L 63/1416 726/24 |
| 2012/0011588 A1* | 1/2012 | Milener | G06F 21/51 726/24 |
| 2012/0054864 A1* | 3/2012 | Linn | G06F 21/51 726/22 |
| 2012/0304244 A1* | 11/2012 | Xie | G06F 21/00 726/1 |
| 2013/0042324 A1 | 2/2013 | Bennett | |
| 2013/0174267 A1 | 7/2013 | Kass | |
| 2014/0096246 A1* | 4/2014 | Morrissey | G06F 21/51 726/23 |
| 2014/0130158 A1* | 5/2014 | Wang | G06F 21/566 726/23 |
| 2014/0173726 A1* | 6/2014 | Varenhorst | H04L 63/1416 726/22 |
| 2014/0259158 A1* | 9/2014 | Brown | G06F 21/554 726/22 |
| 2014/0379812 A1* | 12/2014 | Bastide, II | H04L 51/12 709/206 |
| 2014/0380472 A1* | 12/2014 | Peterson | H04L 63/1416 726/23 |
| 2015/0058991 A1* | 2/2015 | Gourley | G06F 21/567 726/24 |
| 2015/0074802 A1* | 3/2015 | Sanjeev | G06F 21/55 726/22 |
| 2015/0095507 A1* | 4/2015 | Adams | G06F 11/3664 709/229 |
| 2015/0096024 A1* | 4/2015 | Haq | H04L 63/145 726/23 |
| 2015/0156203 A1* | 6/2015 | Giura | H04L 63/101 726/4 |

\* cited by examiner

INTERMEDIATE RESPONSES FOR NON-HTML DOWNLOADS

BACKGROUND

A security device may be positioned between a user device and a server device (e.g., a server device associated with a web site). The security device may be configured to detect (e.g., using URL reputations, blacklists, anti-virus scanning, anti-malware techniques, etc.) malicious and/or suspicious objects (e.g., a Trojan, a worm, a spyware program, etc.), provided by the server device, and may prevent the malicious and/or suspicious objects from being received by the user device.

SUMMARY

According to some possible implementations, one or more security devices may include one or more processors configured to: receive an object destined for a user device, where the object may be of an object type that does not describe a web page; determine that the user device is to be warned regarding the object; determine a warning object based on determining that the user device is to be warned, where the warning object may include information associated with a reason for determining that the user device is to be warned regarding the object, and where the warning object may include information that allows the user device to receive the object; provide the warning object; receive, after providing the warning object, an indication associated with the user device obtaining the object; and allow the user device to obtain the object based on receiving the indication.

According to some possible implementations, a computer-readable medium may store one or more instructions that, when executed by one or more processors, cause the one or more processors to: receive a first object destined for a user device, where the first object may be of an object type that does not describe a web page; identify the first object as a potentially malicious object; determine that the first object is not to be sent to the user device based on identifying the first object as a potentially malicious object; determine a second object based on determining that the first object is not to be sent to the user device, where the second object may include information associated with a reason for determining that the first object is not to be sent to the user device; and provide the second object to the user device, where the second object, when rendered for display by the user device, may provide, to a user of the user device, information that indicates the reason for determining that the first object is not to be sent to the user device.

According to some possible implementations, a method may include: receiving, by one or more devices, an object intended for a user device, where the object may be of an object type that does not describe a web page; determining, by the one or more devices, that the user device is to be warned regarding the object; determining, by the one or more devices, a warning object based on determining that the user device is to be warned, where the warning object may include information that identifies a reason that the user device is to be warned regarding the object, and may include information that allows the user device to receive the object despite being warned; sending, by the one or more devices, the warning object to the user device; receiving, by the one or more devices, information indicating that the user device is to obtain the object despite being warned; and permitting, by the one or more devices, the user device to obtain the object.

DETAILED DESCRIPTION

The following detailed description of example implementations refers to the accompanying drawings. The same reference numbers in different drawings may identify the same or similar elements.

A security device may determine that an object that describes a webpage, contains malicious and/or suspicious content. For example, the security device may determine that a hypertext markup language ("HTML") object (e.g., an HTML document that describes a web page) contains malicious and/or suspicious content. If the security device determines that the HTML object contains malicious content (e.g., content that would be harmful to the user device if received by the user device), the security device may block the HTML object from being sent to the user device, and may provide a block page describing the reason that the HTML object was blocked (e.g., the security device may prevent the user from continuing to the web page). Similarly, if the security device determines that the HTML object contains suspicious content (e.g., content that the security determines may be malicious), then the security device may provide a warning page that warns a user regarding the HTML object (e.g., the HTML object may be modified to include a warning and/or may be stripped of potentially harmful content, such as Javascript, etc.) but may allow the user to choose to proceed with downloading the HTML object (e.g., the security device may allow the user to continue to the webpage).

However, block pages and warning pages may only be provided by the security device when the malicious or suspicious object is of a type that describes a web page, such as an HTML object. If an object of a type that does not describe a web page (e.g., an executable file, a text file, an archived file, etc.) is a malicious object, the security device may block the object from being sent to the user device without providing, to the user, information that indicates a reason that the object was blocked. Additionally, if the object is suspicious, the security device may be unable to provide an intermediate option (e.g., a warning) that may allow the user to elect to receive the object (e.g., despite the object being suspicious).

The term "HTML object," as used herein, includes an object of a type that describes a web page, such as an HTML document or another type of object that describes a web page. Similarly, the term "non-HTML object," as used herein, includes an object of a type that does not describe a web page, such as an executable file, a text file, an archived file, or another type of object that does not describe a web page.

Implementations described herein may allow a security device to provide, to a user device meant to receive a non-HTML object, a security object (e.g., of the same object type as the non-HTML object) that includes information associated with blocking and/or warning the user device regarding the non-HTML object.

Figure 1:
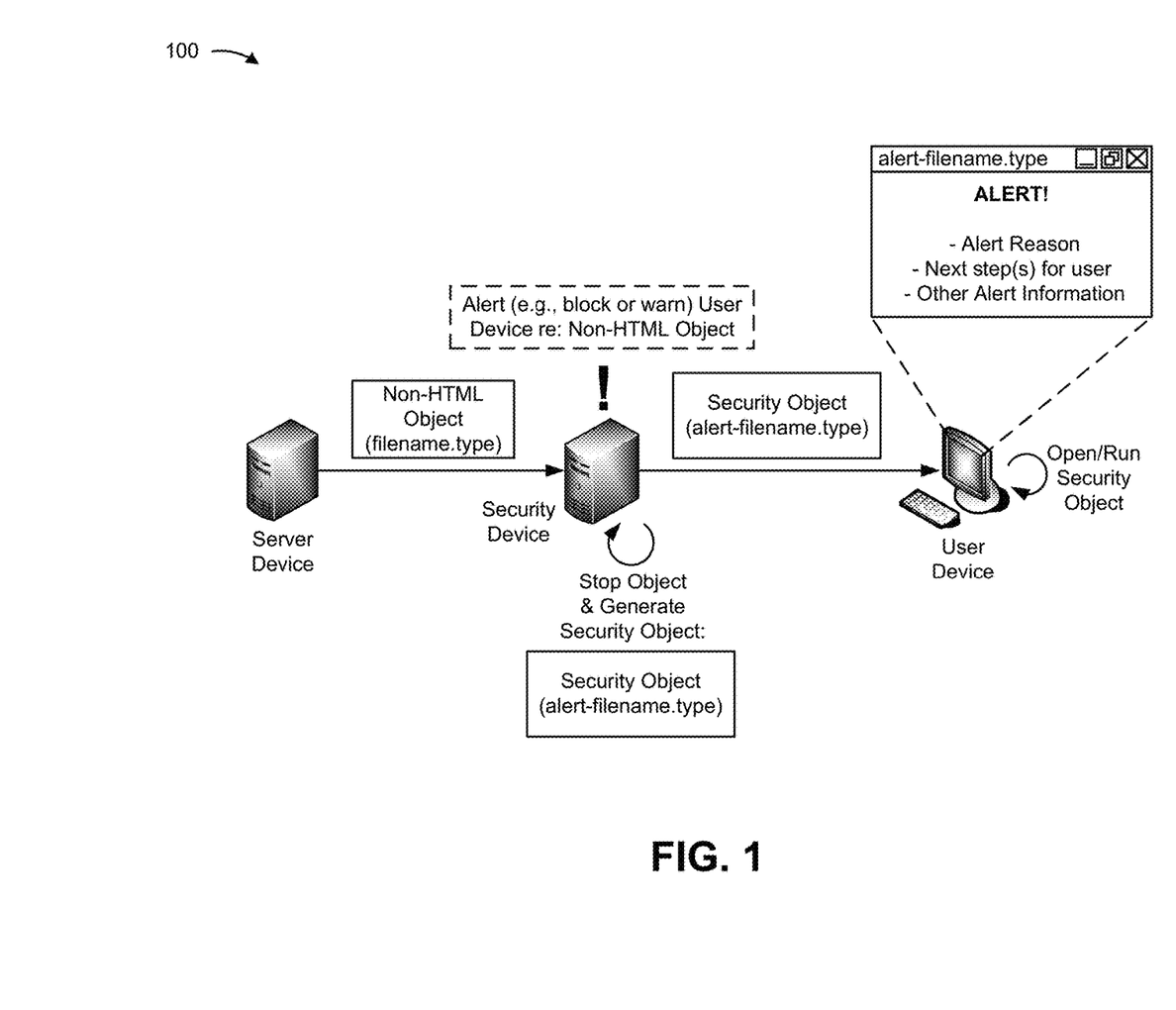
FIG. 1 is a diagram of an overview of an example implementation described herein.

FIG. 1 is a diagram of an overview of an example implementation 100 described herein. For the purposes of example implementation 100, assume that a user device has requested to receive a non-HTML object (e.g., an executable file, a PDF file, etc.) from a server device. Further, assume that a security device, associated with the user device, is positioned to block and/or warn the user device regarding non-HTML objects from being provided to the user device.

As shown in FIG. 1, the server device may provide the non-HTML object to the security device (e.g., when the security device is configured to receive non-HTML objects being sent to the user device). As further shown, the security device may receive the non-HTML object, and may determine (e.g., based on information associated with the server device, based on information included in the non-HTML object) that the security device is to alert (e.g., block, or warn) the user device regarding the non-HTML object. As shown, the security device may stop the non-HTML object from being sent to the user device, and may generate a security object that includes information (e.g., an alert associated with blocking the non-HTML object, an alert associated with warning the user regarding the non-HTML object, etc.) associated with stopping the non-HTML object from being provided to the user device. As shown, the security object may be of the same object type as the non-HTML object.

As further shown, the security device may provide the security object to the user device, and the user device may open the security object. As shown, the user device may provide (e.g., based on opening the security object) information associated a type of alert (e.g., a block, a warning, etc.), information that identifies a reason for the alert, and/or other information associated with the alert (e.g., information that may allow the user to receive the non-HTML object despite the alert, etc.). In this way, a security device may provide a security object, of the same type as a non-HTML object, that includes information associated with blocking and/or warning the user device regarding the non-HTML object.

Figure 2:
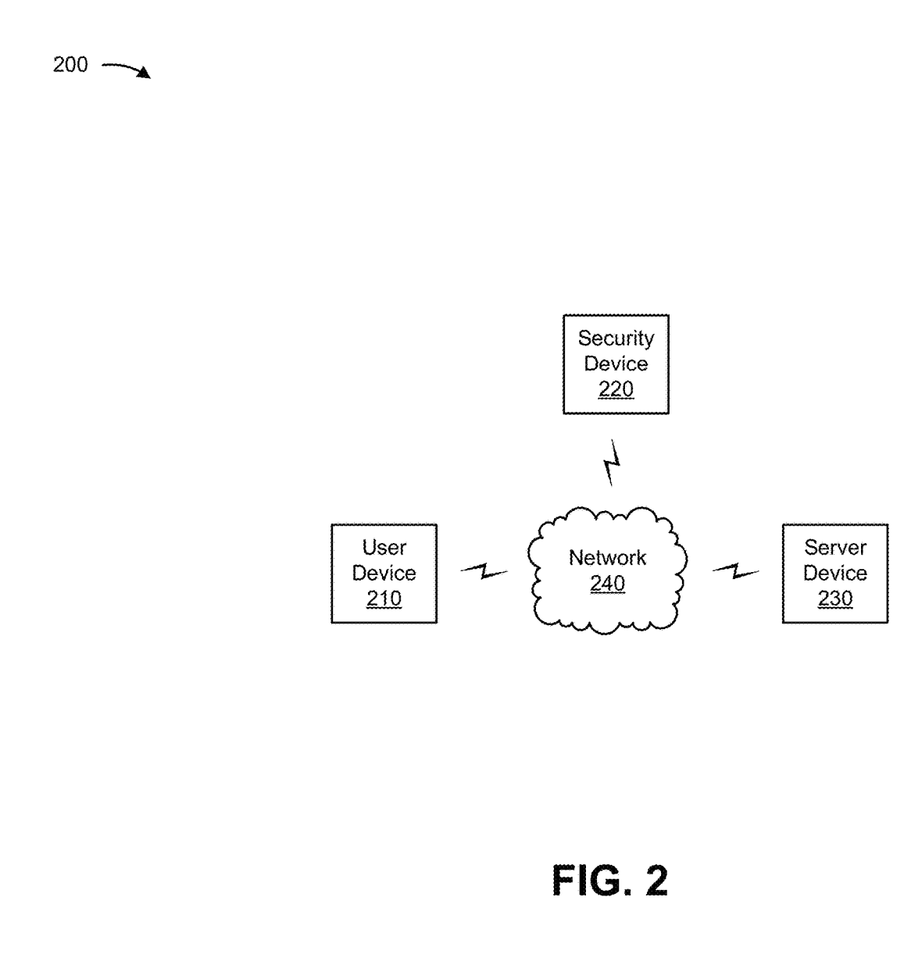
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a user device 210, a security device 220, a server device 230, and a network 240.

User device 210 may include one or more devices capable of communicating with other devices (e.g., server device 230) via a network (e.g., network 240), and/or capable of receiving information provided by another device (e.g., server device 230). For example, user device 210 may include a computing device, such as a laptop computer, a tablet computer, a handheld computer, a desktop computer, a mobile phone (e.g., a smart phone, a radiotelephone, etc.), a personal digital assistant, or a similar device. In some implementations, user device 210 may be capable of generating and sending (e.g., to server device 230) a request (e.g., a request to receive an object stored by server device 230).

Security device 220 may include one or more devices capable of receiving, providing, generating, storing, and/or processing information received and/or provided via a network (e.g., network 240) and/or another device (e.g., server device 230, user device 210, etc.). For example, security device 220 may include a computing device, such as a server. In some implementations, security device 220 may receive information from and/or provide information to user device 210 (e.g., via network 240) and/or server device 230. Additionally, or alternatively, security device 220 may include one or more devices capable of processing and/or transferring communications (e.g., a request, a response, etc.) between user device 210 and server device 230. For example, security device 220 may include a network device, such as a reverse proxy, a server (e.g., a proxy server), a traffic transfer device, a firewall, a router, a load balancer, or the like.

In some implementations, security device 220 may be capable of determining that security device 220 is to block and/or warn user device 210 regarding a non-HTML object being provided to user device 210. Additionally, or alternatively, security device 220 may be capable of determining, generating, and/or obtaining a security object (e.g., a block object, a warning object, etc.), associated with the suspicious object, and providing the security object to user device 210 (e.g., via network 240).

Security device 220 may be used in connection with a single server device 230 or a group of server devices 230 (e.g., a data center). Communications may be routed through security device 220 to reach the one or more server devices 230. For example, security device 220 may be positioned within a network as a gateway to a private network that includes one or more server devices 230. Additionally, or alternatively, security device 220 may be used in connection with a single user device 210 or a group of user devices 210. Communications may be routed through security device 220 to reach the one or more user devices 210. For example, security device 220 may be positioned within a network as a gateway to a private network that includes one or more user devices 210.

Server device 230 may include one or more devices capable of receiving, providing, generating, storing, and/or processing information received and/or provided via a network (e.g., network 240) and/or another device (e.g., security device 220). For example, server device 230 may include a computing device, such as a server (e.g., an application server, a content server, a host server, a web server, etc.).

Network 240 may include one or more wired and/or wireless networks. For example, network 240 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks. In some implementations, network 240 may allow communication between devices, such as user device 210, server device 230, and/or security device 220.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
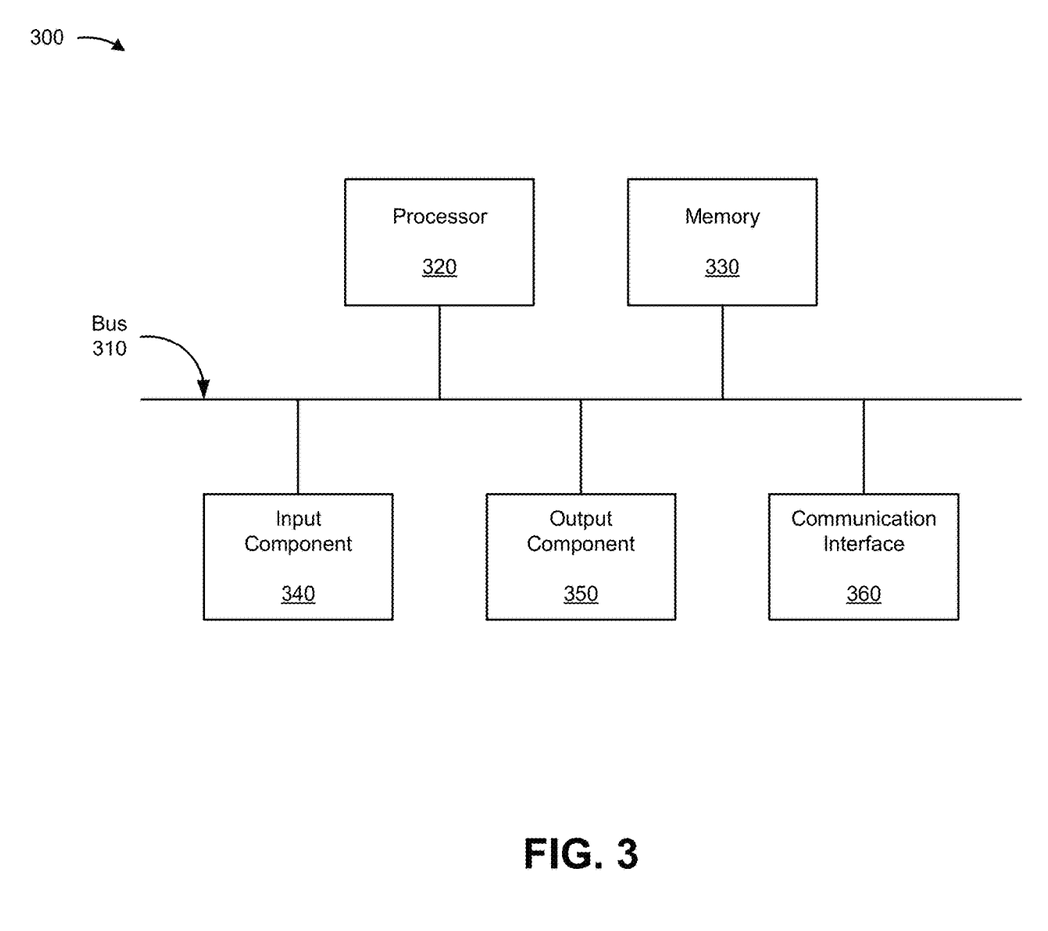
FIG. 3 is a diagram of example components of one or more devices of FIG. 2.

FIG. 3 is a diagram of example components of a device 300. Device 300 may correspond to user device 210, security device 220, and/or server device 230. Additionally, or alternatively, each of user device 210, security device 220, and/or server device 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
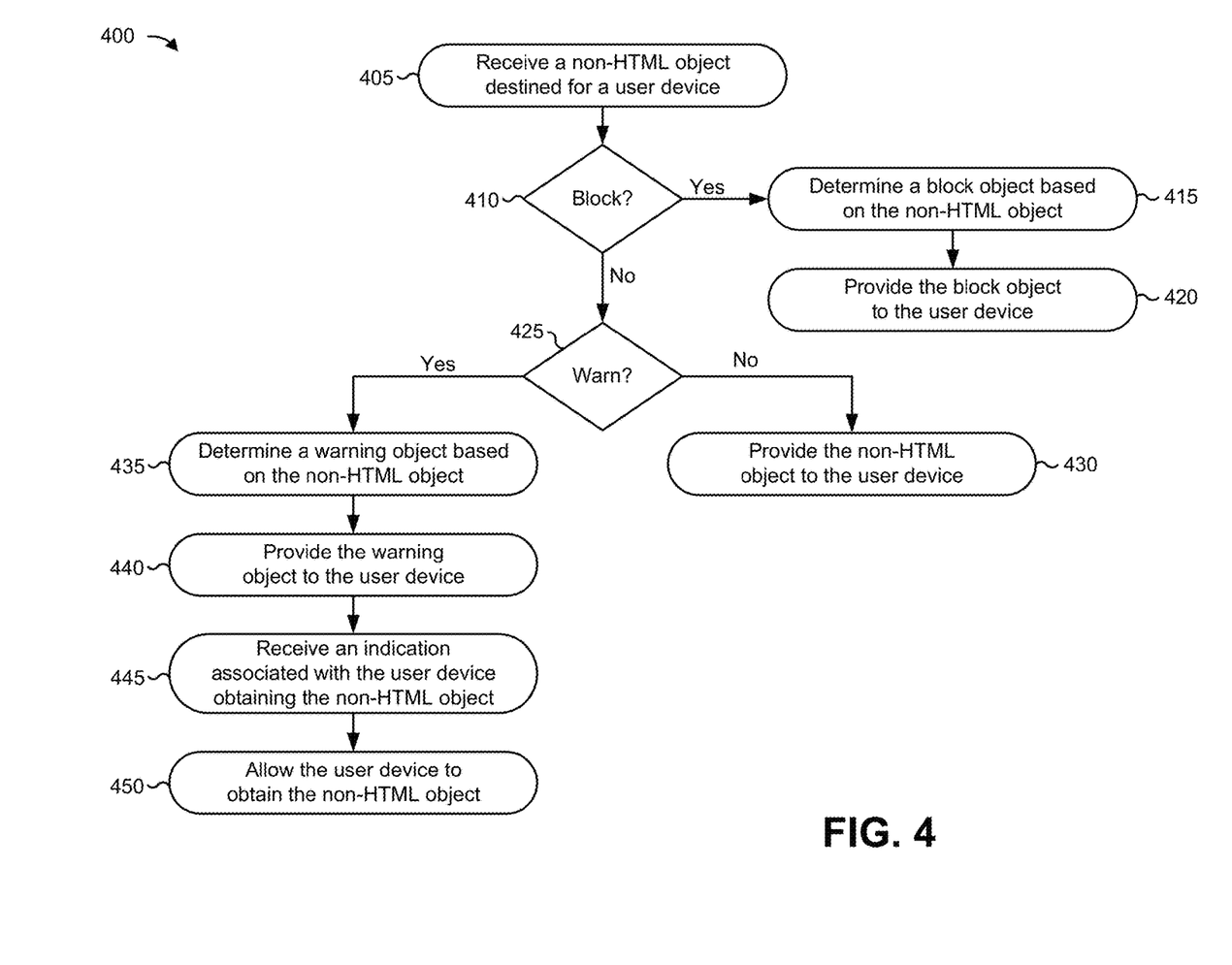
FIG. 4 is a flow chart of an example process for generating and providing a security object associate with a non-HTML object.

FIG. 4 is a flow chart of an example process 400 for generating and providing a security object associate with a non-HTML object. In some implementations, one or more process blocks of FIG. 4 may be performed by security device 220. In some implementations, one or more process blocks of FIG. 4 may be performed by another device or a group of devices separate from or including security device 220, such as user device 210.

As shown in FIG. 4, process 400 may include receiving a non-HTML object destined for a user device (block 405). For example, security device 220 may receive a non-HTML object destined for user device 210. In some implementations, security device 220 may receive the non-HTML object when server device 230 provides the non-HTML object for transmission to user device 210 (e.g., when security device 220 is positioned to receive objects provided to user device 210). Additionally, or alternatively, security device 220 may receive the non-HTML object when another device provides the non-HTML object to security device 220, such as another device included in network 240.

A non-HTML object may include an object of a type that does not describe a web page and/or an object that is of a type other than an HTML object. For example, the non-HTML object may include an executable object (e.g., a Windows executable file ("EXE"), a Windows script file ("WSF"), etc.), a text object (e.g., a Microsoft Word document ("DOC"), a plain text file ("TXT")), a page layout object (e.g. a portable document format file ("PDF"), a picture file ("PCT")), a compressed object (e.g., a zipped file ("ZIP"), a WinRAR compressed archive ("RAR"), etc.), or another type of object that is not an HTML object.

In some implementations, security device 220 may receive the non-HTML object based on a request provided by user device 210. For example, a user of user device 210 may provide (e.g., via an input mechanism of user device 210) information that indicates that user device 210 is to receive the non-HTML object, and user device 210 may send a request to server device 230 (e.g., when server device 230 stores the non-HTML object). In this example, server device 230 may receive the request, and may provide the non-HTML object to security device 220 (e.g., when security device 220 is positioned to receive the non-HTML object before the non-HTML object is sent to user device 210). In some implementations, the user may be unaware that user device 210 has sent a request for the non-HTML object (e.g., when a program running on user device 210 is configured to automatically cause user device 210 to request a non-HTML object, etc.).

In some implementations, security device 220 may receive the non-HTML object based on the non-HTML object being provided by server device 230. For example, server device 230 may send the non-HTML object to user device 210 (e.g., without user device 210 requesting the non-HTML object), and security device 220 may receive the non-HTML object from server device 230.

As further shown in FIG. 4, process 400 may include determining whether to block the non-HTML object from being sent to the user device (block 410). For example, security device 220 may determine whether security device 220 is to block the non-HTML object from being sent to user device 210. In some implementations, security device 220 may determine whether security device 220 is to block the non-HTML object from being sent to user device 210 when security device 220 receives the non-HTML object (e.g., from server device 230). Additionally, or alternatively, security device 220 may determine whether security device 220 is to block the non-HTML object from being sent to user device 210 when security device 220 receives information, indicating that security device 220 is to determine whether to block the non-HTML object from being sent to user device 210, from another device (e.g., another device included in network 240).

In some implementations, security device 220 may determine whether security device 220 is to block the non-HTML object from being sent to user device 210 based on security device 220 identifying the non-HTML object as a malicious object. A malicious object may include an object that security device 220 determines includes content that, if received by user device 210, would be harmful to user device 210. For example, security device 220 may determine that the non-HTML object includes a Trojan, a worm, a spyware program, a virus, a phishing scam, malware software, or another type of content that could be harmful to user device 210.

In some implementations, security device 220 may identify the non-HTML object as a malicious object based on information stored by security device 220. For example, security device 220 may store information that identifies a server device 230 that is known to provide malicious objects, and security device 220 may identify the non-HTML object as being malicious based on information associated with server device 230 that provided the non-HTML object (e.g., when server device 230 that provides the non-HTML object is known to provide malicious objects). As another example, security device 220 may store information associated with known malicious objects (e.g., a list of known malicious objects) and security device 220 may identify the object as being malicious based on the stored information (e.g., when a filename of the non-HTML object matches a filename of a known malicious object included in the list of malicious objects).

Additionally, or alternatively, security device 220 may identify the non-HTML object as a malicious object based on information associated with the non-HTML object. For example, security device 220 may receive the non-HTML object, may analyze the non-HTML object (e.g., using anti-virus software, using anti-malware software, etc.), and may identify the non-HTML object as a malicious object based on a result of the analysis (e.g., when the anti-virus software indicates that the non-HTML object is a malicious object).

Additionally, or alternatively, security device 220 may identify the non-HTML object as a malicious object based on information provided by another device. For example, security device 220 may send the non-HTML object to another device (e.g., another device included in network 240), and the other device may determine that the non-HTML object is a malicious object. In this example, the other device may send, to security device 220, information indicating that the non-HTML object is a malicious object, and security device 220 may identify the non-HTML object as a malicious object based on the information provided from the other device.

In some implementations, security device 220 may determine whether security device 220 is to block the non-HTML object from being sent to user device 210 based on a security configuration associated with security device 220. For example, security device 220 may be configured (e.g., based on a security policy created by an administrator associated with security device 220) to block the non-HTML object from being sent to user device 210 based on the type of object (e.g., when the administrator may wish to prevent a particular type of non-HTML object from being sent to user device 210, such as an EXE object), based on the source of the object (e.g., when the administrator may wish to prevent a non-HTML object, associated with a particular web site, from being sent to user device 210), or based on other information associated with the security configuration.

As further shown in FIG. 4, if the non-HTML object is to be blocked from being sent to user device (block 410—YES), then process 400 may include determining a block object based on the non-HTML object (block 415). For example, security device 220 may determine that security device 220 is to block the non-HTML object from being sent to user device 210, and security device 220 may determine a block object based on the non-HTML object. In some implementations, security device 220 may determine the block object when security device 220 determines that security device 220 is to block the non-HTML object from being sent to user device 210. Additionally, or alternatively, security device 220 may determine the block object when security device 220 receives information, indicating that security device 220 is to determine the block object, from another device (e.g., another device included in network 240).

A block object may include a non-HTML object, determined by security device 220, that security device 220 may provide, to user device 210 (e.g., rather than the non-HTML object received by security device 220), when security device 220 is to block the non-HTML object from being sent to user device 210 (e.g., when security device 220 identifies the non-HTML object as a malicious object, security device 220 may provide the block object to user device 210 rather than the non-HTML object). In some implementations, the block object, determined by security device 220 may be of the same file type as the non-HTML object received by security device 220. For example, if the non-HTML object is of a particular file type (e.g., PDF), then the block object, determined by security device 220 may be of the same file type (e.g., the block object may also be a PDF). In some implementations, the block object may include information that, when displayed by user device 210, indicates a reason that security device 220 blocked the non-HTML object from being sent to user device 210.

Additionally, or alternatively, the block object may include other information associated with blocking the non-HTML object from being sent to user device 210 (e.g., information associated with reporting a false positive, information associated with contacting an administrator, etc.).

In some implementations, security device 220 may determine the block object by generating the block object. For example, security device 220 may determine that security device 220 is to block the non-HTML object from being sent to user device 210 (e.g., based on identifying the non-HTML object as a malicious object), and security device 220 may generate the block object (e.g., based on information stored by security device 220). Additionally, or alternatively, security device 220 may determine the block object by receiving the block object from another device. For example, security device 220 may determine that security device 220 is to block the non-HTML object from being sent to user device 210, and security device 220 may provide a request, associated with generating the block object based on the non-HTML object, to another device (e.g., another device included in network 240). In this example, the other device may receive the request, may generate the block object, and may provide the block object to security device 220.

As further shown in FIG. 4, process 400 may include providing the block object to the user device (block 420). For example, security device 220 may provide the block object to user device 210. In some implementations, security device 220 may provide the block object when security device 220 determines the block object. Additionally, or alternatively, security device 220 may provide the block object when security device 220 receives information, indicating that security device 220 is to provide the block object, from another device (e.g., another device included in network 240).

In some implementations, security device 220 may provide the block object to user device 210, and user device 210 may open the block object. For example, security device 220 may provide the block object (e.g., an EXE object) to user device 210, and user device 210 may open the block object (e.g., user device 210 may run the EXE object). In this example, the information included in the block object (e.g., a reason associated with blocking the non-HTML object from being sent to user device 210, information associated with contacting an administrator, etc.) may be displayed (e.g., via a display screen of user device 210) when user device 210 opens the block object (e.g., when user device 210 runs the EXE object). In this way, security device 220 may provide, to a user of user device 210, information associated with blocking the non-HTML object from being sent to user device 210.

As further shown in FIG. 4, if the non-HTML object is not to be blocked from being sent to user device (block 410—NO), then process 400 may include determining whether the user device is to be warned regarding the non-HTML object (block 425). For example, security device 220 may determine whether security device 220 is to provide a warning to user device 210 regarding the non-HTML object provided by server device 230. In some implementations, security device 220 may determine whether security device 220 is to provide a warning to user device 210 regarding the non-HTML object when security device 220 receives the non-HTML object (e.g., from server device 230). Additionally, or alternatively, security device 220 may determine whether security device 210 is to provide a warning to user device 210 regarding the non-HTML object when security device 210 determines that security device 210 is not to block the non-HTML object from being sent to user device 210 (e.g., after security device 210 determines that security device 210 is not to block the non-HTML object from being sent to user device 210). Additionally, or alternatively, security device 220 may determine whether security device 220 is to provide a warning to user device 210 regarding the non-HTML object when security device 220 receives information, indicating that security device 220 is to determine whether to provide a warning to user device 210, from another device (e.g., another device included in network 240).

In some implementations, security device 220 may determine whether security device 220 is to provide a warning to user device 210 regarding the non-HTML object based on security device 220 identifying the non-HTML object as a suspicious object. A suspicious object may include an object that security device 220 determines to include content that may be harmful to user device 210 (e.g., but is not known to include harmful content). For example, security device 220 may determine that the non-HTML object includes content from an unknown source, content of an unknown type, or another type of content that may be harmful to user device 210.

In some implementations, security device 220 may identify the non-HTML object as a suspicious object based on information stored by security device 220. For example, security device 220 may store information associated with a suspicious file type (e.g., a file type that may contain harmful content), and security device 220 may identify the non-HTML object as a suspicious object based on the information stored by security device 220 (e.g., when the non-HTML object is of a file type that may contain harmful content).

Additionally, or alternatively, security device 220 may identify the non-HTML object as a suspicious object based on information associated with the non-HTML object. For example, the non-HTML object may include information that identifies server device 230 (e.g., that hosts a web site) that provided the non-HTML object, and security device 220 may identify the non-HTML object as suspicious based on the information that identifies server device 230 (e.g., when the web site hosted by server device 230 is a new web site, when the web site hosted by server device 230 is an unknown web site).

Additionally, or alternatively, security device 220 may identify the non-HTML object as a suspicious object based on information provided by another device. For example, security device 220 may send the non-HTML object to another device (e.g., another device included in network 240), and the other device may determine that the non-HTML object is a suspicious object. In this example, the other device may send, to security device 220, information indicating that the non-HTML object is a suspicious object, and security device 220 may identify the non-HTML object as a suspicious object based on the information received from the other device.

In some implementations, security device 220 may determine whether security device 220 is to provide a warning to user device 210 regarding the non-HTML object based on a security configuration associated with security device 220. For example, security device 220 may be configured (e.g., based on a security policy created by an administrator associated with security device 220) to provide a warning to user device 210 regarding the non-HTML object based on the type of object (e.g., when the administrator may wish to warn a user of user device 210 regarding a particular non-HTML object type, such as a ZIP object), based on the source of the object (e.g., when the administrator may wish to warn the user of user device 210 regarding a non-HTML object associated with a particular web site), or based on other information associated with the security configuration.

As further shown in FIG. 4, if the user device is not to be warned regarding the non-HTML object (block 425—NO), then process 400 may include providing the non-HTML object to the user device (block 430). For example, security device 220 may determine that security device 220 is not to provide a warning, associated with the non-HTML object, to user device 210, and security device 220 may provide the non-HTML object to user device 210 (e.g., when the non-HTML object is not identified as malicious or suspicious, security device 220 may provide the non-HTML object to user device 210).

As further shown in FIG. 4, if the user device is to be warned regarding the non-HTML object (block 425—YES), then process 400 may include determining a warning object based on the non-HTML object (block 435). For example, security device 220 may determine that security device 220 is to provide a warning to user device 210 regarding the non-HTML object, and security device 220 may determine a warning object based on the non-HTML object. In some implementations, security device 220 may determine the warning object when security device 220 determines that security device 220 is to provide a warning to user device 210 regarding the non-HTML object. Additionally, or alternatively, security device 220 may determine the warning object when security device 220 receives information, indicating that security device 220 is to determine the warning object, from another device (e.g., another device included in network 240).

A warning object may include a non-HTML object, determined by security device 220, that security device 220 may provide, to user device 210 (e.g., rather than the non-HTML object received by security device 220), when security device 220 is to provide a warning to user device 210 regarding the non-HTML object (e.g., when security device 220 identifies the non-HTML object as a suspicious object, security device 220 may provide the warning object to user device 210 rather than the non-HTML object). In some implementations, the warning object, determined by security device 220 may be of the same file type as the non-HTML object received by security device 220. For example, if the non-HTML object is of a particular file type (e.g., DOC), then the warning object, determined by security device 220 may be of the same file type (e.g., the warning object may also be a DOC object). In some implementations, the warning object may include information that, when displayed by user device 210, indicates a reason that security device 220 is providing the warning to user device 210. Additionally, or alternatively, the warning object may contain information associated with verifying that the user of user device 210 wishes to receive the non-HTML object (e.g., a string of characters, a button, etc.).

In some implementations, the warning object may include information that allows user device 210 to obtain the non-HTML object (e.g., even though a warning may be provided, even though the non-HTML object may be identified as a suspicious object, etc.). For example, the warning object may include information (e.g., a uniform resource locator ("URL"), a link, etc.) that may allow the user of user device 210 to obtain the non-HTML document (e.g., security device 220 may provide the non-HTML object when the user sends a request to the URL, security device 220 may allow user device 210 to receive the non-HTML object when the user selects the link, etc.).

Additionally, or alternatively, the warning object may include other information associated with warning user device 210 regarding the non-HTML object (e.g., information associated with reporting a false positive, information associated with contacting an administrator, etc.).

In some implementations, security device 220 may determine the warning object by generating the warning object. For example, security device 220 may determine that security device 220 is to provide a warning to user device 210 regarding the non-HTML object (e.g., based on identifying the non-HTML object as a suspicious object), and security device 220 may generate the warning object (e.g., based on information stored by security device 220). Additionally, or alternatively, security device 220 may determine the warning object by receiving the warning object from another device. For example, security device 220 may determine that security device 220 is to provide a warning to user device 210 regarding the non-HTML object, and security device 220 may provide a request, associated with generating the warning object based on the non-HTML object, to another device (e.g., another device included in network 240). In this example, the other device may receive the request, may generate the warning object, and may provide the warning object to security device 220.

As further shown in FIG. 4, process 400 may include providing the warning object to the user device (block 440). For example, security device 220 may provide the warning object to user device 210. In some implementations, security device 220 may provide the warning object when security device 220 determines the warning object. Additionally, or alternatively, security device 220 may provide the warning object when security device 220 receives information, indicating that security device 220 is to provide the warning object, from another device (e.g., another device included in network 240).

In some implementations, security device 220 may provide the warning object to user device 210, and user device 210 may open the warning object. For example, security device 220 may provide the warning object (e.g., a PDF) to user device 210, and user device 210 may open the warning object (e.g., user device 210 may display the PDF). In this example, the information included in the warning object (e.g., a reason associated with warning user device 210 regarding the non-HTML object, information that may allow user device 210 to obtain the non-HTML object, information associated with contacting an administrator, etc.) may be displayed (e.g., via a display screen of user device 210) when user device 210 opens the warning object (e.g., when user device 210 displays the PDF).

As further shown in FIG. 4, process 400 may include receiving an indication associated with the user device obtaining the non-HTML object (block 445). For example, security device 220 may receive an indication associated with user device 210 obtaining the non-HTML object provided by server device 230. In some implementations, security device 220 may receive the indication when user device 210 provides the indication (e.g., after security device 220 provides the warning object to user device 210, user device 210 opens the warning object, and the user of user device 210 provides input indicating that user device 210 is to obtain the non-HTML object). Additionally, or alternatively, security device 220 may receive the indication when another device provides the indication, such as another device included in network 240.

In some implementations, the indication may include information that indicates that user device 210 is to receive the non-HTML object associated with the warning object. For example, security device 220 may provide the warning object (e.g., associated with a suspicious non-HTML object) and the user of user device 210 may provide (e.g., via user device 210), information indicating that user device 210 is to receive the non-HTML object (e.g., even though the non-HTML object is a suspicious object). In some implementations, the indication may be associated with the warning object (e.g., when the warning object includes a link that allows user device 210 to request the non-HTML object). Additionally, or alternatively, the indication may include a request associated with the non-HTML object. For example, the indication may include a request that indicates that user device 210 wishes to receive the non-HTML object from security device 220 (e.g., when security device 220 stores the non-HTML object after receiving the non-HTML object).

As further shown in FIG. 4, process 400 may include allowing the user device to obtain the non-HTML object (block 450). For example, security device 220 may allow user device 210 to obtain the non-HTML object provided by server device 230. In some implementations, security device 220 may allow user device 210 to obtain the non-HTML object when security device 220 receives the indication, associated with user device 210 obtaining the non-HTML object, from user device 210. Additionally, or alternatively, security device 220 may allow user device 210 to obtain the non-HTML object based on information, indicating that security device 220 is to allow user device 210 to obtain the non-HTML object, from another device (e.g., another device included in network 240).

In some implementations, security device 220 may allow user device 210 to obtain the non-HTML object by providing the non-HTML object to user device 210. For example, security device 220 may receive the indication from user device 210, and security device 220 may provide the non-HTML object to user device 210 based on receiving the indication (e.g., when security device 220 stores the non-HTML object). Additionally, or alternatively, security device 220 may allow user device 210 to obtain the non-HTML object by allowing another device (e.g., server device 230) to provide the non-HTML object. For example, security device 220 may receive the indication from user device 210 (e.g., include a request to provide the non-HTML object), security device 220 may forward the indication (e.g., including the request) to server device 230, and server device 230 may provide the non-HTML object (e.g., security device 220 may allow user device 210 to receive the non-HTML object to be sent to user device 210). In this way, security device 220 may provide, to a user of user device 210, information associated with warning user device 210 regarding the non-HTML object while still allowing user device 210 to obtain the non-HTML object.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5A:
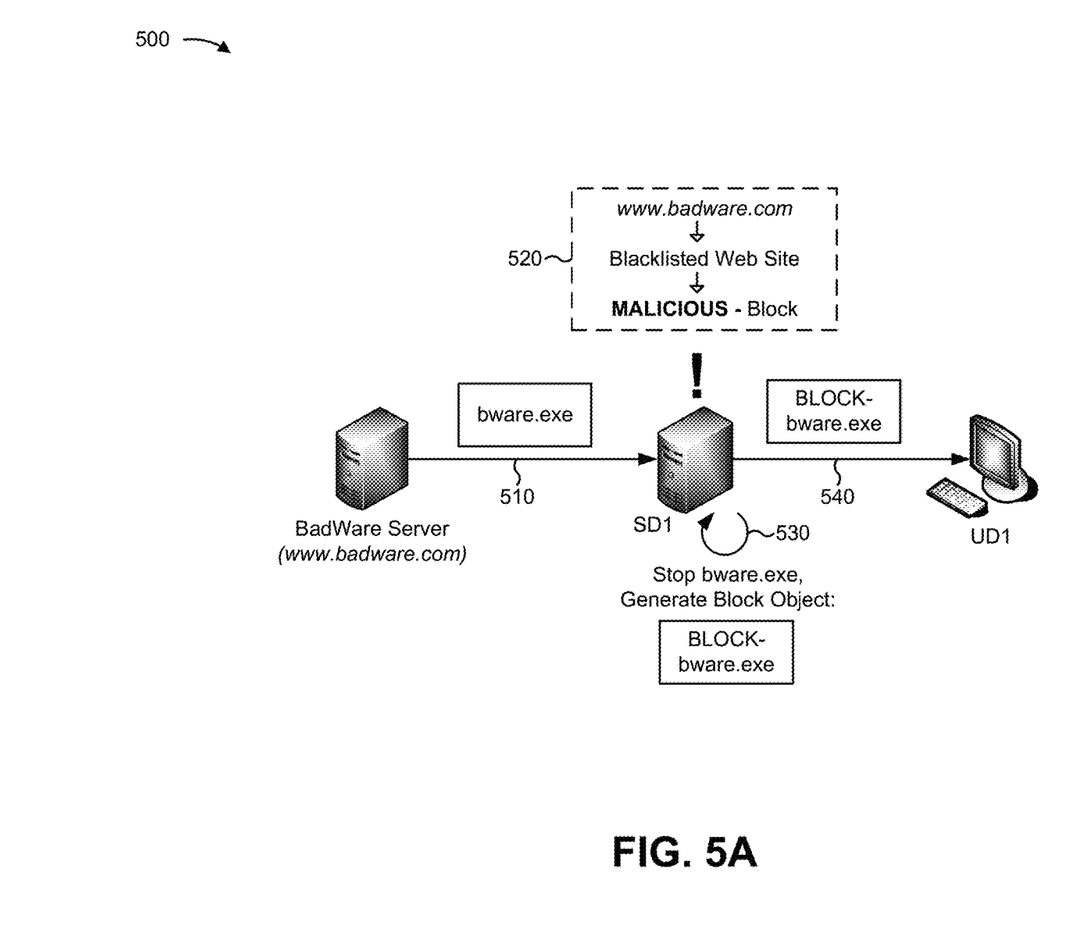
FIGS. 5A and 5B are diagrams of an example implementation relating to the example process shown in FIG. 4.
Figure 5B:
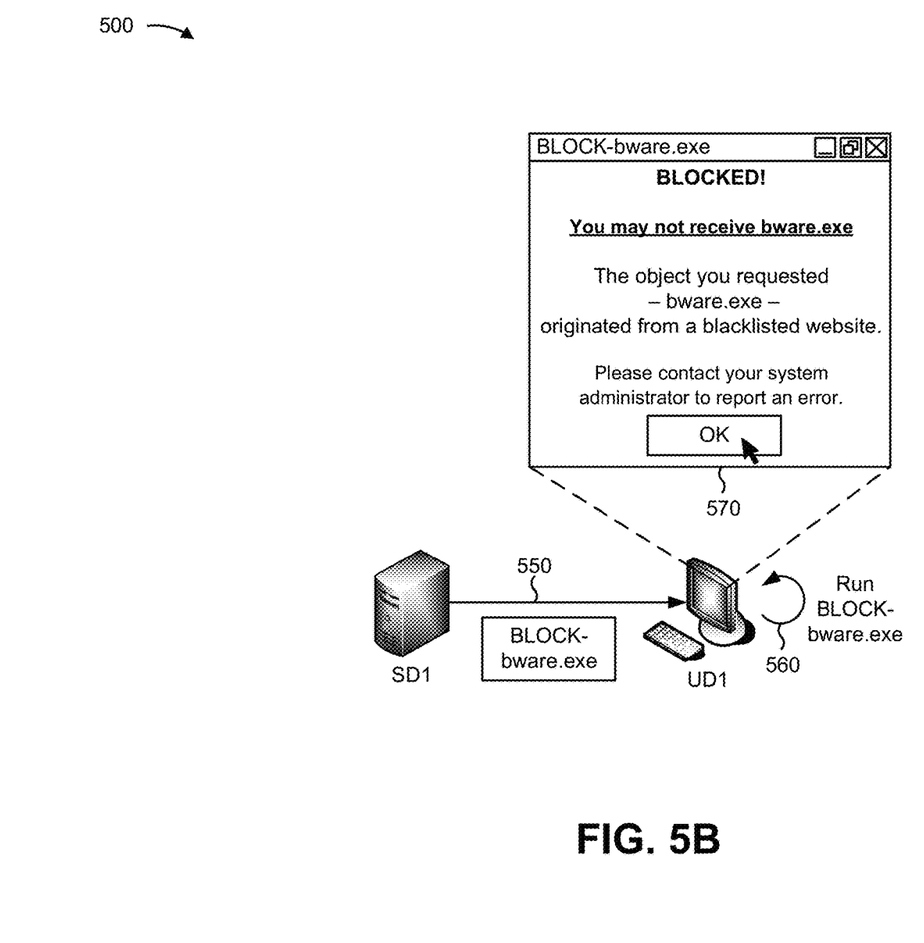

FIGS. 5A and 5B are diagrams of an example implementation 500 relating to example process 400 shown in FIG. 4. For the purposes of example implementation 500, assume that a user device, UD1, sends a request, associated with a non-HTML object (e.g., bware.exe), to a server (e.g., BadWare server) that hosts a web site (e.g., www.badware.com). Further, assume that a security device, SD1, is positioned to block and/or warn UD1 regarding non-HTML objects being provided to UD1.

As shown in FIG. 5A, and by reference number 510, the BadWare server may provide the non-HTML object (e.g., bware.exe) based on the request sent by UD1. As shown by reference number 520, SD1 may receive the bware.exe object, and may determine (e.g., based on information stored by SD1) that the web site associated with the bware.exe object, www.badware.com, is a blacklisted web site. As further shown, SD1 may identify (e.g., based on a configuration of SD1) the bware.exe object as a malicious object (e.g., when SD1 is configured to identify an object received from a blacklisted website as a malicious object), and may determine that SD1 is to block the bware.exe object from being sent to UD1. As shown by reference number 530, SD1 may stop the bware.exe object from being provided to UD1, and may generate a block object based on the bware.exe object. As shown, the block object, BLOCK-bware.exe, may be of the same object type as the malicious bware.exe object. As shown by reference number 540, SD1 may provide the BLOCK-bware.exe object to UD1.

As shown in FIG. 5B, UD1 may receive the BLOCK-bware.exe object from SD1. As shown by reference number 560, UD1 may run the BLOCK-bware.exe based on receiving the BLOCK-bware.exe. As shown by reference number 570, UD1 may display information, included in the BLOCK-bware.exe object, to a user of UD1. As shown, the information included in the BLOCK-bware.exe object may include information indicating that the bware.exe object has been blocked from being sent to UD1 (e.g., "BLOCKED! You may not receive bware.exe"), information indicating a reason that SD1 has blocked the bware.exe object from being sent to UD1 (e.g., "The object you requested—bware.exe—originated from a blacklisted website"), and other information associated with blocking the bware.exe object from being sent to UD1 (e.g., "Please contact your system administrator to report an error").

As indicated above, FIGS. 5A and 5B are provided merely as an example. Other examples are possible and may differ from what was described with regard to FIGS. 5A and 5B.

Figure 6A:
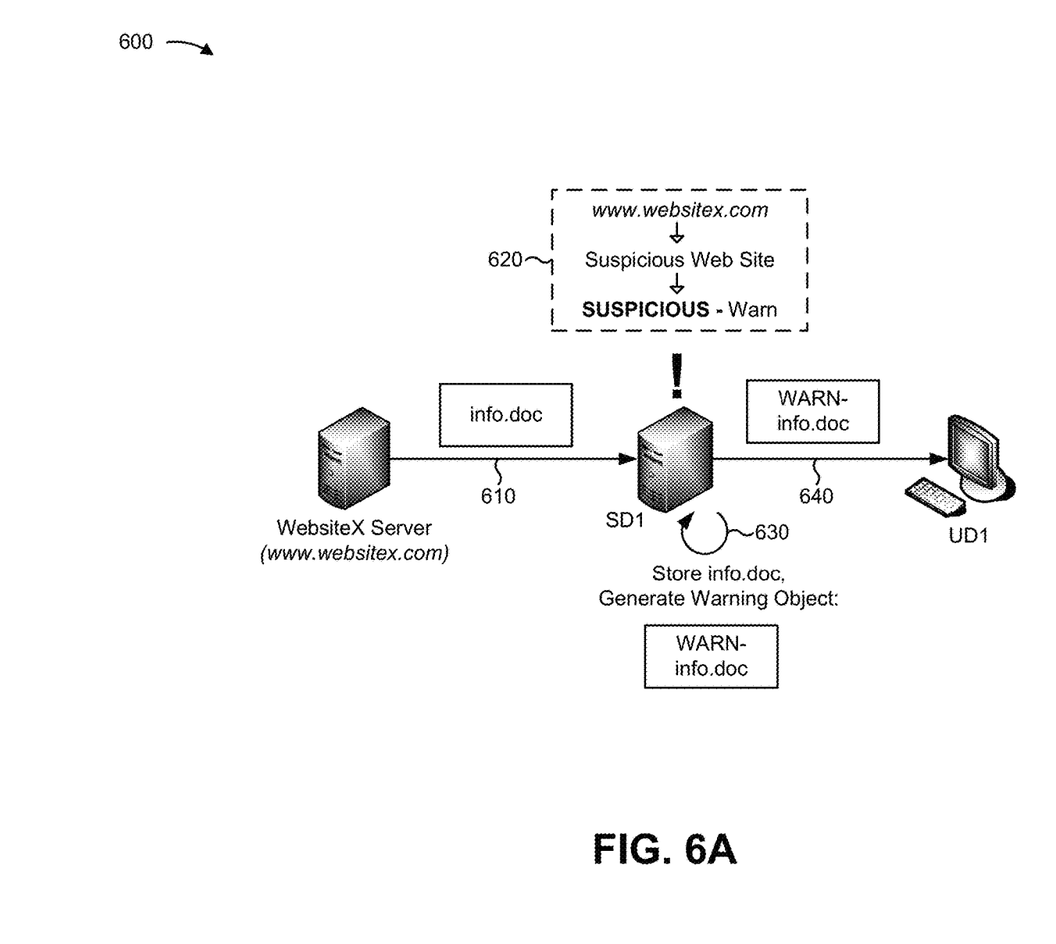
FIGS. 6A and 6B are diagrams of an additional example implementation relating to the example process shown in FIG. 4.
Figure 6B:
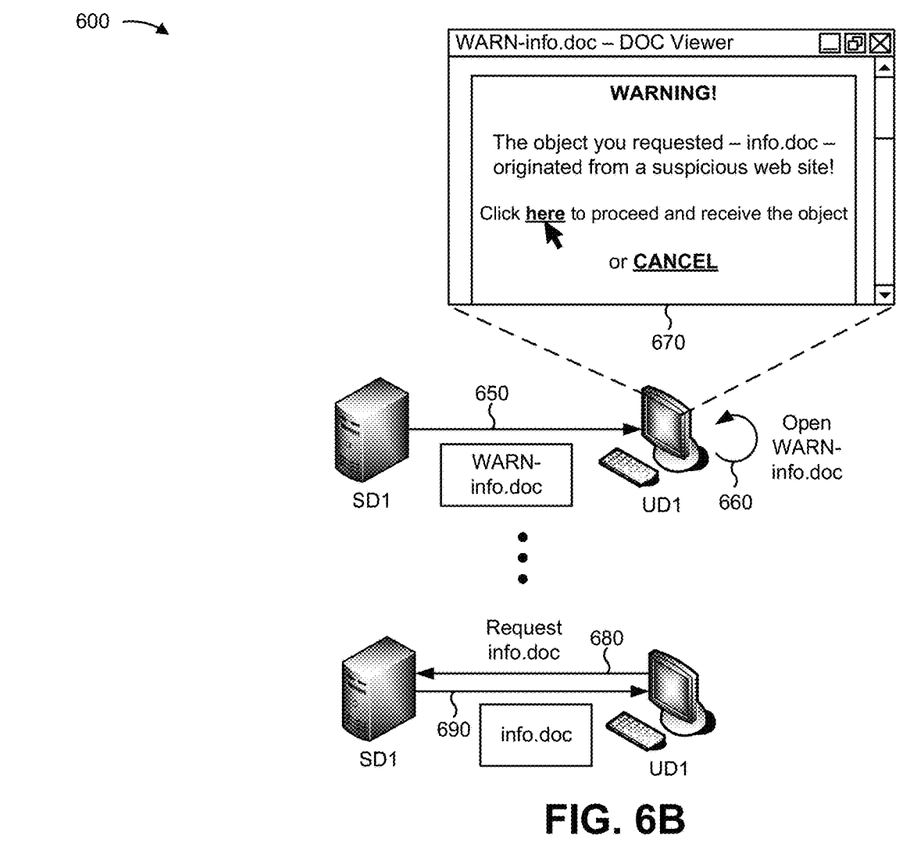

FIGS. 6A and 6B are diagrams of an example implementation 600 relating to example process 400 shown in FIG. 4. For the purposes of example implementation 600, assume that a user device, UD1, sends a request associated with a non-HTML object (e.g., info.doc), to a server (e.g., WebSiteX server) that hosts a web site (e.g., www.websitex.com). Further, assume that a security device, SD1, is positioned to block and/or warn UD1 regarding non-HTML objects being provided to UD1.

As shown in FIG. 6A, and by reference number 610, the WebsiteX server may provide the non-HTML object (e.g., info.doc) based on the request sent by UD1. As shown by reference number 620, SD1 may receive the info.doc object, and may determine (e.g., based on information stored by SD1) that the website associated with the info.doc object, www.websitex.com, is a suspicious website. As further shown, SD1 may identify (e.g., based on a configuration of SD1) the info.doc object as a suspicious object (e.g., when SD1 is configured to identify an object received from a suspicious website as a suspicious object rather than a malicious object), and may determine that SD1 is to warn UD1 regarding the info.doc object. As shown by reference number 630, SD1 may store the info.doc object (e.g., such that the object may be provided to UD1 at a later time), and may generate a warning object based on the info.doc object. As shown, the warning object, WARN-info.doc, may be of the same object type as the suspicious info.doc object. As shown by reference number 640, SD1 may provide the WARN-info.doc object to UD1.

As shown in FIG. 6B, and by reference number 650, UD1 may receive the WARN-info.doc object from SD1. As shown by reference number 660, UD1 may open the WARN-info.doc based on receiving the WARN-info.doc. As shown by reference number 670, UD1 may display information, included in the WARN-info.doc object, to a user of UD1. As shown, the information included in the WARN-info.doc object may include information indicating that UD1 is being warned regarding the info.doc object (e.g., "WARNING!"), information indicating a reason that SD1 has warned UD1 regarding the info.doc object (e.g., "The object you requested—info.doc—originated from a suspicious web site!"), and information associated with allowing UD1 to obtain the info.doc object (e.g., "Click here to proceed and receive the object or cancel"). As further shown, the user may indicate (e.g., by selecting the link provided in the WARN-info.doc object) that UD1 is to obtain the info.doc (e.g., despite the warning). As shown by reference number 680, UD1 may send (e.g., based on selecting the link) a request to SD1 that indicates that UD1 is to obtain the info.doc object. As shown by reference number 690, SD1 may receive the request from UD1, and may provide (e.g., based on storing the info.doc object) the info.doc object to UD1.

As indicated above, FIGS. 6A and 6B are provided merely as an example. Other examples are possible and may differ from what was described with regard to FIGS. 6A and 6B.

Implementations described herein may allow a security device to provide, to a user device meant to receive a non-HTML object, a security object (e.g., of the same type as the non-HTML object) that includes information associated with blocking and/or warning the user device regarding the non-HTML object.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. One or more security devices, comprising:
   a memory; and
   one or more processors, at least partially implemented in hardware, to:
   receive, from a server device, a non-hypertext markup language (HTML) object destined for a user device, the non-HTML object being of a non-HTML object type that does not describe a web page,
   the non-HTML object type including one of:
      an executable object type, or
      or
      a compressed object type;
   determine the non-HTML object type of the non-HTML object;
   determine, based on the non-HTML object type, that the non-HTML object contains suspicious content that is potentially harmful to the user device;
   determine, based on a configuration policy, the non-HTML object type, and determining that the non-HTML object contains the suspicious content, that the user device is to be warned regarding the non-HTML object;
   determine a warning object type that matches the non-HTML object type;
   generate, based on determining that the user device is to be warned, a warning object of the warning object type;
   add, to the warning object, warning information associated with a reason that the user device is to be warned regarding the non-HTML object;
   add, to the warning object, a link associated with the non-HTML object,
      the link enabling the user device to request the non-HTML object;
   provide the warning object, that includes the warning information, to the user device;
   receive, after providing the warning object to the user device, an indication associated with the user device requesting the non-HTML object based on the warning object,
      the indication being received based on a user interaction with the link; and
   provide, to the server device and based on receiving the indication associated with the user device requesting the non-HTML object, data that causes the server device to provide the non-HTML object to the user device.

2. The one or more security devices of claim 1, where the one or more processors are further to:
   identify the non-HTML object as a harmful object based on the suspicious content; and
   where the one or more processors, when determining that the user device is to be warned regarding the non-HTML object, are to:
      determine that the user device is to be warned based on identifying the non-HTML object as the harmful object.

3. The one or more security devices of claim 1, where the one or more processors are further to:
   determine information that identifies a security configuration associated with the user device; and
   where the one or more processors, when determining that the user device is to be warned regarding the non-HTML object, are to:
      determine that the user device is to be warned based on the information that identifies the security configuration.

4. The one or more security devices of claim 1, where the one or more processors are further to:
   provide a request for the warning information to another device; and
   receive the warning information from the other device based on the request.

5. The one or more security devices of claim 1, where the one or more processors are further to:

forward a request, associated with the non-HTML object, based on receiving the indication associated with the user device requesting the non-HTML object; and receive a response to the request based on forwarding the request, the response including the non-HTML object.

6. The one or more security devices of claim 1, where the one or more processors are further to:

store the non-HTML object in a memory; and where the one or more processors, when providing the data that causes the server device to provide the non-HTML object to the user device, are to:

provide the non-HTML object to the server device from the memory.

7. A non-transitory computer-readable medium storing instructions, the instructions comprising:

one or more instructions that, when executed by one or more processors, cause the one or more processors to:

receive, from a server device, a first non-hypertext markup language (HTML) object destined for a user device, the first non-HTML object being of a first non-HTML object type that does not describe a web page, the first non-HTML object type including one of:

an executable object type, or or a compressed object type;

determine the first non-HTML object type of the first non-HTML object;

determine, based on the first non-HTML object type, that the first non-HTML object is a potentially malicious object that contains suspicious content that is potentially harmful to the user device;

determine, based on a configuration policy, the first non-HTML object type, and determining that the first non-HTML object contains the suspicious content, that the first non-HTML object is not to be sent to the user device;

determine a second non-HTML object type that matches the first non-HTML object type;

generate, based on determining that the first non-HTML object is not to be sent to the user device, the second non-HTML object based on the second non-HTML object type;

add, to the second non-HTML object, information associated with a reason that the first non-HTML object is not to be sent to the user device;

add, to the second non-HTML object, a link associated with the first non-HTML object, the link enabling the user device to request the first non-HTML object; and provide the second non-HTML object, that includes the information associated with the reason, to the user device, the second non-HTML object, when rendered for display by the user device, providing the information associated with the reason that the first non-HTML object is not to be sent to the user device.

8. The non-transitory computer-readable medium of claim 7, where the one or more instructions, when executed by the one or more processors, further cause the one or more processors to:

determine that the first non-HTML object is to be blocked from being sent to the user device; and wherein the information associated with the reason indicates that the first non-HTML object is to be blocked from being sent to the user device.

9. The non-transitory computer-readable medium of claim 7, where the one or more instructions, when executed by the one or more processors, further cause the one or more processors to:

determine that the user device is to be warned regarding the first non-HTML object; and wherein the one or more instructions, that cause the one or more processors to generate the second non-HTML object, cause the one or more processors to:

generate the second non-HTML object based on determining that the user device is to be warned regarding the first non-HTML object.

10. The non-transitory computer-readable medium of claim 7, where the one or more instructions, when executed by the one or more processors, further cause the one or more processors to:

determine information that identifies a security configuration associated with the user device; and where the one or more instructions, that cause the one or more processors to determine that the first non-HTML object is not to be sent to the user device, cause the one or more processors to:

determine that the first non-HTML object is not to be sent to the user device based on the information that identifies the security configuration.

11. The non-transitory computer-readable medium of claim 7, where the one or more instructions, when executed by the one or more processors, further cause the one or more processors to:

receive, after providing the second non-HTML object to the user device, an indication associated with the user device requesting the first non-HTML object based on the second non-HTML object; and provide the first non-HTML object to the user device based on receiving the indication associated with the user device requesting the first non-HTML object.

12. The non-transitory computer-readable medium of claim 11, where the one or more instructions, when executed by the one or more processors, further cause the one or more processors to:

forward a request, associated with the first non-HTML object, based on receiving the indication associated with the user device requesting the first non-HTML object;

receive a response to the request based on forwarding the request, the response including the first non-HTML object; and provide the response to the user device.

13. A method, comprising:

receiving, by one or more devices and from a server device, a non-hypertext markup language (HTML) object intended for a user device, the non-HTML object being of a non-HTML object type that does not describe a web page, the non-HTML object type including one of:

an executable object type, or or a compressed object type;

determining, by the one or more devices, the non-HTML object type of the non-HTML object;

determining, by the one or more devices and based on the non-HTML object type, that the non-HTML object contains suspicious content that is potentially harmful to the user device;

determining, by the one or more devices and based on a configuration policy, the non-HTML object type, and determining that the non-HTML object contains the suspicious content, that the user device is to be warned regarding the non-HTML object;

determining, by the one or more devices, a warning object type that matches the non-HTML object type;

generating, by the one or more devices and based on determining that the user device is to be warned regarding the non-HTML object, a warning object of the warning object type;

adding, by the one or more devices and to the warning object, warning information that identifies a reason that the user device is to be warned regarding the non-HTML object;

adding, by the one or more devices and to the warning object, a link associated with the non-HTML object, the link enabling the user device to request the non-HTML object sending, by the one or more devices, the warning object, that includes the warning information, to the user device;

receiving, by the one or more devices, information indicating that the user device requests the non-HTML object despite being warned,
the information indicating that the user device requests the non-HTML object being received based on a user interaction with the link; and providing, by the one or more devices and to the server device and based on receiving the information indicating that the user device requests the non-HTML object, data that causes the server device to provide the non-HTML object to the user device.

14. The method of claim 13, further comprising:
identifying the non-HTML object as a harmful object based on the suspicious content; and
where determining that the user device is to be warned regarding receiving the non-HTML object comprises:
determining that the user device is to be warned based on identifying the non-HTML object as the harmful object.

15. The method of claim 13, further comprising:
determining information that identifies a security configuration associated with the user device; and
where determining that the user device is to be warned regarding receiving the non-HTML object comprises:
determining that the user device is to be warned based on the information that identifies the security configuration.

16. The method of claim 13, further comprising:
providing a request for the warning information to another device; and
receiving the warning information from the other device based on the request.

17. The method of claim 13, further comprising:
forwarding a request, associated with the non-HTML object, included in the information indicating that the user device requests the non-HTML object; and
receiving a response to the request based on forwarding the request,
the response including the non-HTML object.

18. The method of claim 13, further comprising:
storing the non-HTML object in a memory; and
where providing the data that causes the server device to provide the non-HTML object to the user device comprises:
providing the non-HTML object to the server device from the memory.

19. The one or more security devices of claim 1, where the suspicious content includes at least one of:
a Trojan,
a worm,
a spyware program,
a virus,
a phishing scam, or
malware software.

20. The method of claim 13, where the suspicious content includes at least one of:
a Trojan,
a worm,
a spyware program,
a virus,
a phishing scam, or
malware software.

* * * * *